(12) United States Patent
Periaswamy

(10) Patent No.: US 11,243,763 B2
(45) Date of Patent: Feb. 8, 2022

(54) METHODS, SYSTEMS AND COMPUTER PROGRAMS FOR IMPLEMENTING INDUSTRIAL IOT BASED COLLABORATIVE PLATFORMS

(71) Applicant: Yokogawa Electric Corporation, Tokyo (JP)

(72) Inventor: Subramanian Periaswamy, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 50 days.

(21) Appl. No.: 16/776,718

(22) Filed: Jan. 30, 2020

(65) Prior Publication Data

US 2020/0334035 A1  Oct. 22, 2020

(30) Foreign Application Priority Data

Apr. 18, 2019  (IN) .............................. 201911015574

(51) Int. Cl.

| | |
|---|---|
| *G06F 8/77* | (2018.01) |
| *G06F 8/20* | (2018.01) |
| *G05B 19/042* | (2006.01) |
| *G16Y 40/30* | (2020.01) |
| *H04L 9/06* | (2006.01) |
| *G06Q 10/10* | (2012.01) |

(52) U.S. Cl.
CPC ........... *G06F 8/77* (2013.01); *G05B 19/0428* (2013.01); *G06F 8/20* (2013.01); *G06Q 10/103* (2013.01); *G16Y 40/30* (2020.01); *H04L 9/0643* (2013.01); *H04L 2209/38* (2013.01)

(58) Field of Classification Search
None
See application file for complete search history.

(56) References Cited

U.S. PATENT DOCUMENTS

| 6,591,265 | B1 * | 7/2003 | Erickson | ............... G06F 21/316 |
|---|---|---|---|---|
| 2007/0143398 | A1 * | 6/2007 | Graham | ................. G06Q 40/02 709/204 |
| 2009/0099895 | A1 * | 4/2009 | Carrier | ................... G06Q 50/01 705/75 |
| 2010/0058197 | A1 * | 3/2010 | Chee | ................... G06F 21/6218 715/751 |

* cited by examiner

*Primary Examiner* — Qing Chen
(74) *Attorney, Agent, or Firm* — Sheridan Ross P.C.

(57) ABSTRACT

The invention provides methods, systems and computer programs relating to a collaboration platform configured for collaborative development and distribution of applications or software components for controlling, monitoring, interfacing or otherwise communicating with one or more devices. The invention comprises (i) receiving a specification for development of a software component (ii) receiving participation proposals from a plurality of entities, (iii) selecting a set of collaborator entities for collaboratively developing the software component, (iv) assigning one or more responsibilities associated with development of the software component to each entity within the selected set of collaborator entities, (v) generating an access controlled portal that is associated with the collaborative development of the software component, and (vi) publishing the collaboratively developed software component for implementing the software component to control, monitor or interface with, one or more devices.

31 Claims, 10 Drawing Sheets

600

Each block contains information describing one or more of:

- Parties to a contract
- Each party's obligations under the contract
- Each party's rights under the contract
- Sensors/devices involved in the contract implementation
- Sensor/device permission associated with implementation of the contract
- Payment information

BLOCK [i]

Figure 6

METHODS, SYSTEMS AND COMPUTER PROGRAMS FOR IMPLEMENTING INDUSTRIAL IOT BASED COLLABORATIVE PLATFORMS

FIELD OF THE INVENTION

The present invention relates to the field of collaborative development of software solutions, and more specifically to methods, systems and computer programs relating to a collaboration platform configured for collaborative development and distribution of applications or software components for controlling, monitoring, interfacing or otherwise communicating with one or more devices.

BACKGROUND OF THE INVENTION

Industrial environments, for example environments for manufacturing, production, extraction, construction, and others, involve complex systems and devices, and equally complex workflows. Operators in these environments must account for a large set of parameters and metrics for design, development, deployment, and operation of different technologies in order to achieve functional objectives and to optimize performance. Historically, collection of data corresponding to such parameters had been largely manual, and therefore slow and expensive. The emergence of the Internet of Things (IoT) has however made it possible to connect continuously to a wide range of devices and sensors and to meaningfully analyze and respond to data from such devices and sensors. While IOT capabilities have traditionally be considered relevant for implementation within consumer devices, IOT solutions have now migrated to industrial settings and are referred to as industrial IOT/IIOT.

It has however been found that the complexity of industrial environments is high, the parameters being monitored are critical, and the number of different controls and sensors involved is therefore correspondingly large—as a result of which, the complexity of dealing with data from multiple devices or sensors makes it difficult to readily produce technology solutions that are relevant and effective for the industrial sector.

There is accordingly a need for improved solutions for device based data collection in industrial environments, as well as for improved methods and systems for enabling the collected data to be used to develop and distribute improved device based monitoring, control, and diagnosis solutions for implementation within industrial environments.

SUMMARY

The invention provides methods, systems and computer programs relating to a collaboration platform configured for collaborative development and distribution of applications or software components for controlling, monitoring, interfacing or otherwise communicating with one or more devices.

In a method embodiment, the invention comprises a method for collaborative development of a software component for controlling, monitoring or interfacing with one or more devices configured for process or apparatus monitoring or control within an industrial environment, the method comprising (i) receiving at a development server platform, a specification for development of a software component for controlling, monitoring or interfacing with one or more devices, (ii) receiving participation proposals from a plurality of entities, each participation proposal including information describing participation parameters that such entity proposes for its participation in collaborative development of the software component, (iii) selecting from among the plurality of entities, a set of collaborator entities for collaboratively developing the software component, wherein the set of collaborator entities comprises at least two entities, and wherein the at least two entities are distinct from the development server platform, (iv) assigning one or more responsibilities associated with development of the software component to each entity within the selected set of collaborator entities, wherein one or more responsibilities assigned to at least a first entity within the selected set of collaborator entities includes enabling at least a second entity within the selected set of collaborator entities, to access parameter data generated by a first set of devices controlled by the first entity, (v) generating an access controlled portal that is associated with the collaborative development of the software component, wherein generating the access controlled portal includes defining (a) a first set of access rights associated with the access controlled portal, wherein the first set of access rights defines access or functionality available within the access controlled portal to each entity among the selected set of collaborator entities, and (b) a second set of access rights associated with the access controlled portal, wherein the second set of access rights defines access enabled by the first entity for the second entity to access the parameter data generated by the first set of devices controlled by the first entity, and (vi) publishing the collaboratively developed software component for implementing the software component to control, monitor or interface with, one or more devices. In various embodiments, the method may include one or more method limitations discussed in more detail hereinbelow.

The invention additionally provides a system for collaborative development of a controller for one or more devices that are configured for process or apparatus monitoring or control within an industrial environment. The system comprises at least one server configured to (i) receive at a development server platform, a specification for development of a software component for controlling, monitoring or interfacing with one or more devices, (ii) receive participation proposals from a plurality of entities, each participation proposal including information describing participation parameters that such entity proposes for its participation in collaborative development of the software component, (iii) select from among the plurality of entities, a set of collaborator entities for collaboratively developing the software component, wherein the set of collaborator entities comprises at least two entities, and wherein the at least two entities are distinct from the development server platform, (iv) assign one or more responsibilities associated with development of the software component to each entity within the selected set of collaborator entities, wherein one or more responsibilities assigned to at least a first entity within the selected set of collaborator entities includes enabling at least a second entity within the selected set of collaborator entities, to access parameter data generated by a first set of devices controlled by the first entity, (v) generate an access controlled portal that is associated with the collaborative development of the software component, wherein generating the access controlled portal includes defining (a) a first set of access rights associated with the access controlled portal, wherein the first set of access rights defines access or functionality available within the access controlled portal to each entity among the selected set of collaborator entities, and (b) a second set of access rights associated with the access controlled portal, wherein the second set of access rights defines access enabled by the first entity for the second entity to access the parameter data generated by the first set of devices controlled by the first entity, and (vi) publish the collaboratively developed software component for implementing the software component to control, monitor or interface with, one or more devices. In various embodiments, the system may include one or more method limitations discussed in more detail hereinbelow.

Yet further, the invention provides a computer program product for collaborative development of a software component for controlling, monitoring or interfacing with one or more devices configured for process or apparatus monitoring or control within an industrial environment, the computer program product comprising a non-transitory computer usable medium having a computer readable program code embodied therein, the computer readable program code comprising instructions for implementing within a processor based computing system, the steps of (i) receiving at a development server platform, a specification for development of a software component for controlling, monitoring or interfacing with one or more devices, (ii) receiving participation proposals from a plurality of entities, each participation proposal including information describing participation parameters that such entity proposes for its participation in collaborative development of the software component, (iii) selecting from among the plurality of entities, a set of collaborator entities for collaboratively developing the software component, wherein the set of collaborator entities comprises at least two entities, and wherein the at least two entities are distinct from the development server platform, (iv) assigning one or more responsibilities associated with development of the software component to each entity within the selected set of collaborator entities, wherein one or more responsibilities assigned to at least a first entity within the selected set of collaborator entities includes enabling at least a second entity within the selected set of collaborator entities, to access parameter data generated by a first set of devices controlled by the first entity, (v) generating an access controlled portal that is associated with the collaborative development of the software component, wherein generating the access controlled portal includes defining (a) a first set of access rights associated with the access controlled portal, wherein the first set of access rights defines access or functionality available within the access controlled portal to each entity among the selected set of collaborator entities, and (b) a second set of access rights associated with the access controlled portal, wherein the second set of access rights defines access enabled by the first entity for the second entity to access the parameter data generated by the first set of devices controlled by the first entity, and (vi) publishing the collaboratively developed software component for implementing the software component to control, monitor or interface with, one or more devices. In various embodiments, the computer program product may include one or more method limitations discussed in more detail hereinbelow.

BRIEF DESCRIPTION OF THE ACCOMPANYING DRAWINGS

FIG. 6 illustrates an exemplary structure for a transaction block within a distributed ledger in accordance with specific implementations of the present invention.

DETAILED DESCRIPTION

The present invention provides methods, systems and computer programs relating to a collaborative development platform configured for collaborative development and distribution of applications or software components for controlling, monitoring, interfacing or otherwise communicating with one or more devices.

For the purposes of the below written description, the terms "device", "IOT device", "IOT sensor" and "sensor" may be used interchangeably and shall be understood as referring to a device or component that is configured to monitor or control parameters corresponding to one or more assets, devices, components, tags, hardware, software or data parameters, for example within an industrial environment.

Figure 1:
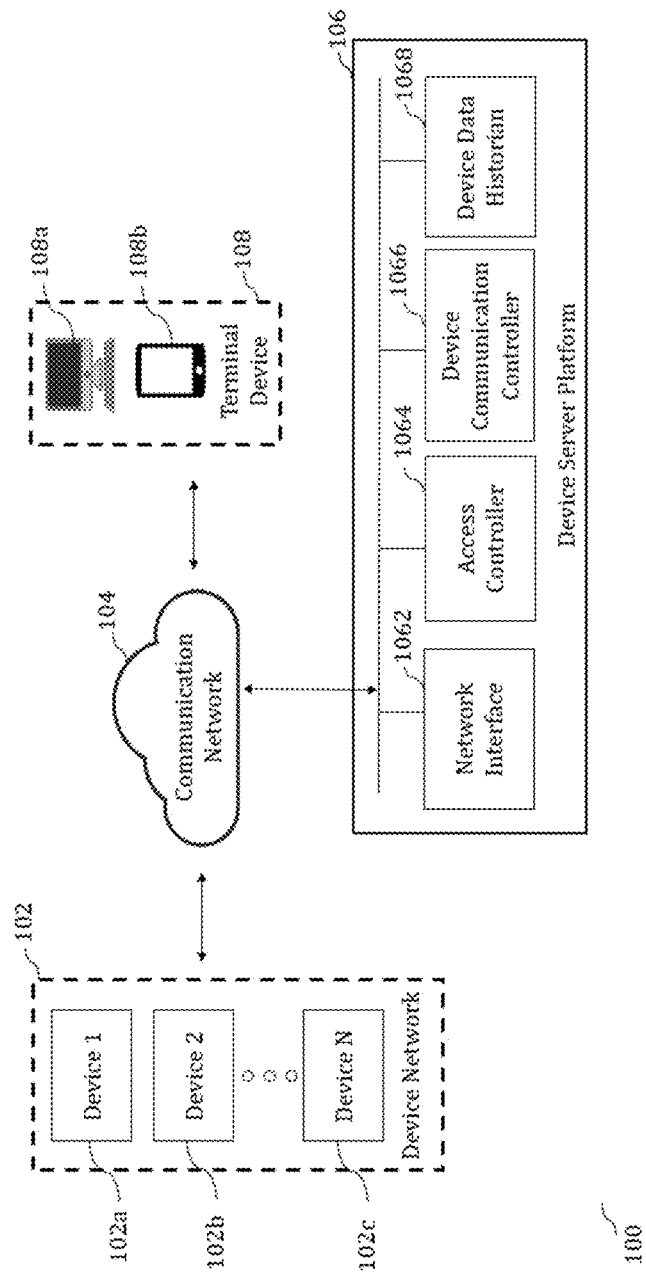
FIG. 1 illustrates a system environment of a type that can be used to implement the teachings of the present invention.

FIG. 1 illustrates a system environment of a kind that can implement the teachings of the present invention. System environment 100 includes a device network 102 configured to monitor or control operating parameters corresponding to, or to otherwise interface or communicate with, one or more assets, devices, components, tags, hardware, software or data parameters, for example, within an industrial environment. Device network 102 includes exemplary device 1 102*a*, device 2 102*b*, up to device N 102*c*, which device are individually or in aggregate configured to monitor or control operating parameters corresponding to, or to otherwise interface or communicate with, one or more assets, devices, components, tags, hardware, software or data parameters, for example, within an industrial environment. Each of the devices within device network 102 may comprise any one or more of a device, a machine, a sensor, a software stack embedded into a hardware device, an industrial control system, or a network gateway. In addition to having monitoring, controlling, interfacing or communicative functionality, devices within device network 102 may be configured to provide secure, bi-directional connectivity between, and management of assets, devices, components, tags, hardware, software or data parameters (located for example, within an industrial environment) on the one side, and a device server platform 106 on the other side.

In an embodiment of the invention, the connectivity or communication between device network 102 and device server platform 106 may be achieved through communication network 104—which may comprise any underlying network that enables data communication between two or more devices, and may include without limitation, any of a local area network, a wide area network, the internet, or any other data network.

Device server platform 106 is a server platform comprising one or more servers and is configured to enable network based monitoring of, control of, interfacing with, or communication with, one or more assets, devices, components, tags, hardware, software or data parameters (that are located for example, within an industrial environment) through device network 102. One or more servers within device server platform 106 may be configured to implement network interface 1062, access controller 1064, device communication controller 1066 and device data historian 1068. In various embodiments, device server platform 106 may be located within device network 102, or within a network communicably coupled with device network 102, or may be cloud based.

Network interface 1062 comprises a processor implemented network interface configured to enable bidirectional network based communication (i) between device server platform 106 and one or more devices within device network 102 and/or (ii) between device server platform 106 and one or more terminal device(s) 108. In an embodiment of the invention, network interface 106 is a processor implemented network interface configured to enable bidirectional network based communication (i) between device communication controller 1066 and one or more devices within device network 102 and (ii) between one or more terminal device(s) 108 and device controller 1066.

Device communication controller 1066 comprises a processor implemented controller configured to (i) monitor or control one or more functions within, or to interface or communicate with, devices within device network 102 and (ii) through said devices, or to monitor, control, or interface or communicate with one or more assets, devices, components, tags, hardware, software or data parameters within a system environment (for example an industrial environment). In a particular embodiment, device communication controller 1066 may be configured to monitor or control functions of devices within device network 102 (and/or assets, devices, components, tags, hardware, software or data parameters that are in turn monitored or controlled by devices within device network 102) based on instructions received from terminal device(s) 108.

Access controller 1064 comprises a processor implemented controller configured to provide access control functionality in respect of device server platform 106. Access controller 1064 is configured to determine whether one or more devices within device network 102 have been granted access rights to device server platform 106 and/or have been granted communication rights with device server platform 106. Said access rights may be granted by a registration process during set up or configuration of devices within device network 102, wherein technicians setting up the devices and/or a system operator configuring or operating device server platform 106 specify whether (i) device server platform 106 is granted access rights to monitor and/or control a particular device and (ii) a particular device is granted rights to transmit data to device server platform 106. The access rights corresponding to one or more devices within device network 102 may be stored in a repository or database of access rights within or communicatively coupled with device server platform 106. Thereafter, prior to accessing data from or forwarding monitoring or control instructions to a device from device platform server 106, access controller 1064 ascertains the specified access rights associated with said device, and either permits or prevents the data access, device monitoring, device control, or device communication or device interface operation.

Device data received from one or more devices within device network 102 may be stored in device data historian 1068 that is within or communicatively coupled with device server platform 106. In an embodiment, the device data is time series data, and includes one or more identifiers that can be used to determine an identity or network location of a device and/or device network from which the data has been received, a time stamp, and one or more data parameters corresponding to a state of the device and/or a state of an asset, sensor, device, component, tag, hardware or software (for example, within an industrial environment) that is being monitored by the device.

Terminal device 108 (which may be communicably coupled through communication network 104, with device server platform 106) may comprise any computing device 108*a*, mobile communication device 108*b*, or other data processing device, that is capable of network-based communication. By enabling terminal device(s) 108 to communicatively interface with device server platform 106 through communication network 104 and network interface 1062, a user or operator of terminal device(s) 108 may remotely monitor and control one or more devices within device network 102 and/or one or more assets, devices, sensors, components, tags, hardware, software or data parameters within an industrial environment.

In a particular embodiment of system environment 100, access controller 1064 may be additionally configured to determine whether one or more terminal devices 108 requesting access to device server platform 106, or one or more users or operators requesting access to device server platform 106 (or requesting access to one or more device within device network 102, through device server platform 106) have been granted sufficient (or any) access rights to device server platform 106 or to the concerned device within device network 102. In certain embodiments, said access rights may have been granted during a prior registration process, wherein specific users/operators/terminal devices are granted access rights to device server platform 106 and/or to one or more device within device network 102. The access rights corresponding to one or more users/operators/terminal devices may be stored in a repository or database of access rights within or communicatively coupled with device server platform 106. Thereafter, prior to forwarding data to, or receiving monitoring or control instructions from, a user/operator/terminal device, access controller 1064 analyzes the specified access rights associated with said user/operator/terminal device, and either permits or rejects the access operation, device monitoring operation, device control operation or device interface or communication operation.

While FIG. 1 illustrates only a single device network 102, it would be understood that device server platform 106 may be communicatively coupled with and configured to monitor and control a plurality of device networks, each comprising one or more distinct set of devices.

Figure 2:
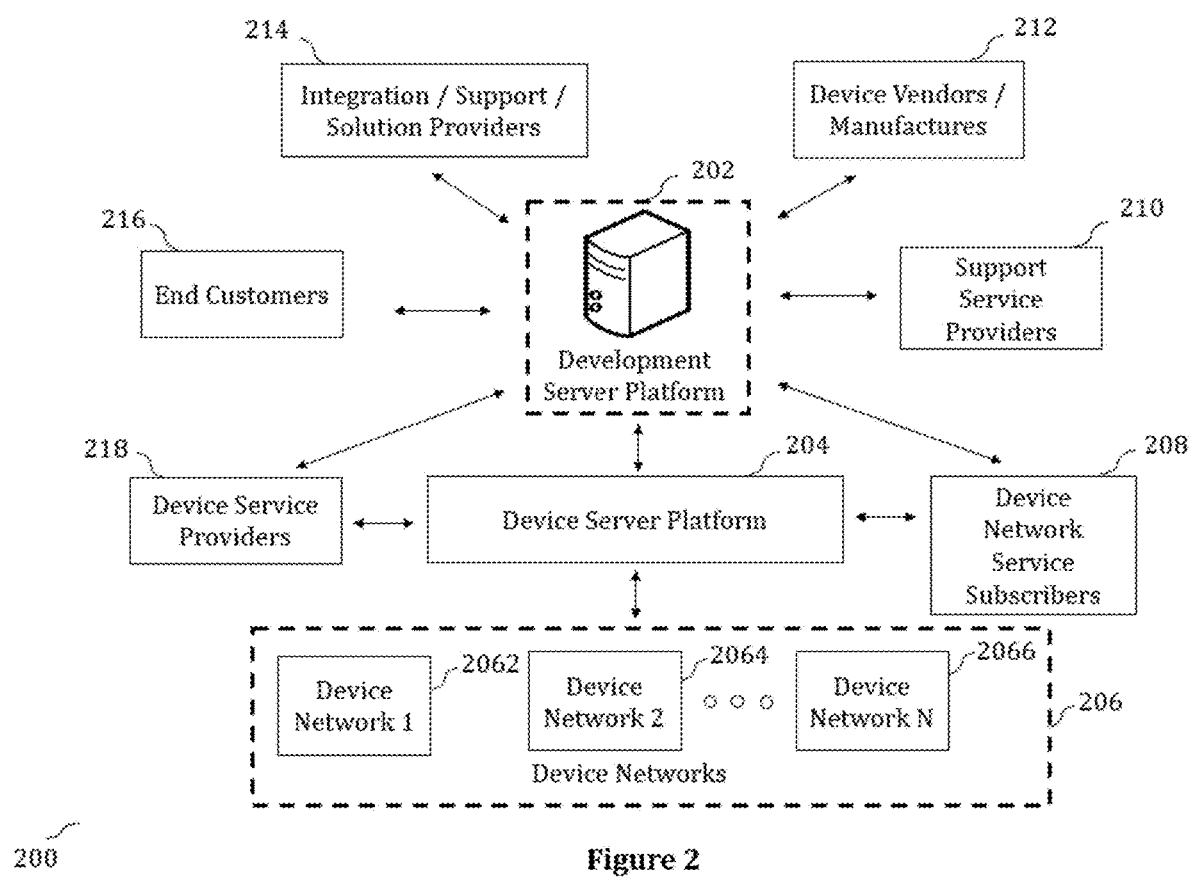
FIG. 2 illustrates a collaborative system environment in accordance with the teachings of the present invention, configured to provide a collaborative development and distribution platform for IIOT technologies.

FIG. 2 illustrates a collaborative system environment 200 in accordance with the present invention—which platform may in an embodiment be configured to provide a collaborative development and distribution platform for software components or software solutions.

An essential element of system environment 200 is development server platform 202—which is a server based platform configured to enable collaborative development and distribution of software applications or components. Development server platform 202 may comprise a single computer/server, a single processor and a single memory device, or alternatively may comprise multiple computers/servers working in combination with multiple memory devices (for example multiple databases). The various functionalities of development server platform 202 may be implemented through a single computer/server, or may be divided among multiple computers/servers. Development server platform 202 is configured to assist in the various stages and implementations of the collaborative application development and distribution—and its configuration and components are described in more detail in connection with FIG. 3 and FIGS. 7 to 9 below.

It will be observed from FIG. 2 that development server platform 202 is communicably coupled with at least one device server platform 204 (of the kind discussed previously in connection with FIG. 1) that is communicatively coupled with and configured to monitor and control a set of device networks 206, said set of device networks comprising one or more device networks (of a kind previously discussed in connection with FIG. 1). In the system environment 200, the set of device networks 206 comprises device network 1 2062, device network 2 2026 up to device network N 2066. Device server platform 204 may be configured to enable monitoring or control of, or interface or communication with, one or more devices within the set of device networks 206 in the manner described briefly in connection with FIG. 1 above. In various embodiments, device server platform 204 may be located within any device network within the set of device networks 206, or within a network communicably coupled with any one or more of the device networks within the set of device networks 206, or may be cloud based.

The communicative coupling between development server platform 202 and device server platform 204 enables development server platform 202 to request and receive from device server platform, device data corresponding to one or more device within the set of device networks 206—which is discussed in more detail in connection with the subsequent Figures.

Further, as illustrated in FIG. 2, development server platform 202 may be communicatively coupled with a plurality of other entities—so as to enable the plurality of coupled entities to collaborate through development server platform 202 for the purposes of collaborative development of software solutions or applications. Exemplary, non-limiting collaborating entities that may be communicably coupled with development server platform 202 include:
- device network service subscribers 208—comprising one or more subscribers to device network monitoring and control services that can be availed through device server platform 204
- Support service providers 210—comprising one or more entities that provide device related support services (e.g. repair, upgrade, servicing and/or periodic maintenance services)
- Device vendors/device manufacturers 212—comprising one or more vendors or manufacturers of devices, or one or more vendors or manufacturers of assets, sensors, components, tags, hardware, software or systems (for example, that are configured to operate within an industrial environment) that that are monitored by devices or IOT sensors
- Integration support/solution providers 214—comprising one or more service providers that provide support or technology solutions for integrating device technology within an industrial environment
- End customers 216—comprising one or more customers or entities that have implemented a technology solution to monitor or control assets, devices, sensors, components, tags, hardware, software or systems (for example, within an industrial environment)
- device service providers 218—comprising one or more service providers or entities who provide device based services to entities or end customers that have implemented device based technology solutions within an industrial environment
- Marketing and sales teams (not shown) connected with marketing/sales of product offerings connected to the device server platform 204
- End customer business teams (not shown)
- device server platform development teams/end user development teams (not shown)
- Logistics service providers (not shown)

As discussed in more detail below, system environment 200 is configured to enable a plurality of collaborating entities (including for example any of the collaborating entities illustrated in FIG. 2) to collaboratively interact through development server platform 202 to develop and/or distribute one or more software solutions or device specific solutions capable of implementation for monitoring or controlling one or more devices within device networks through a device server platform 204.

Figure 3:
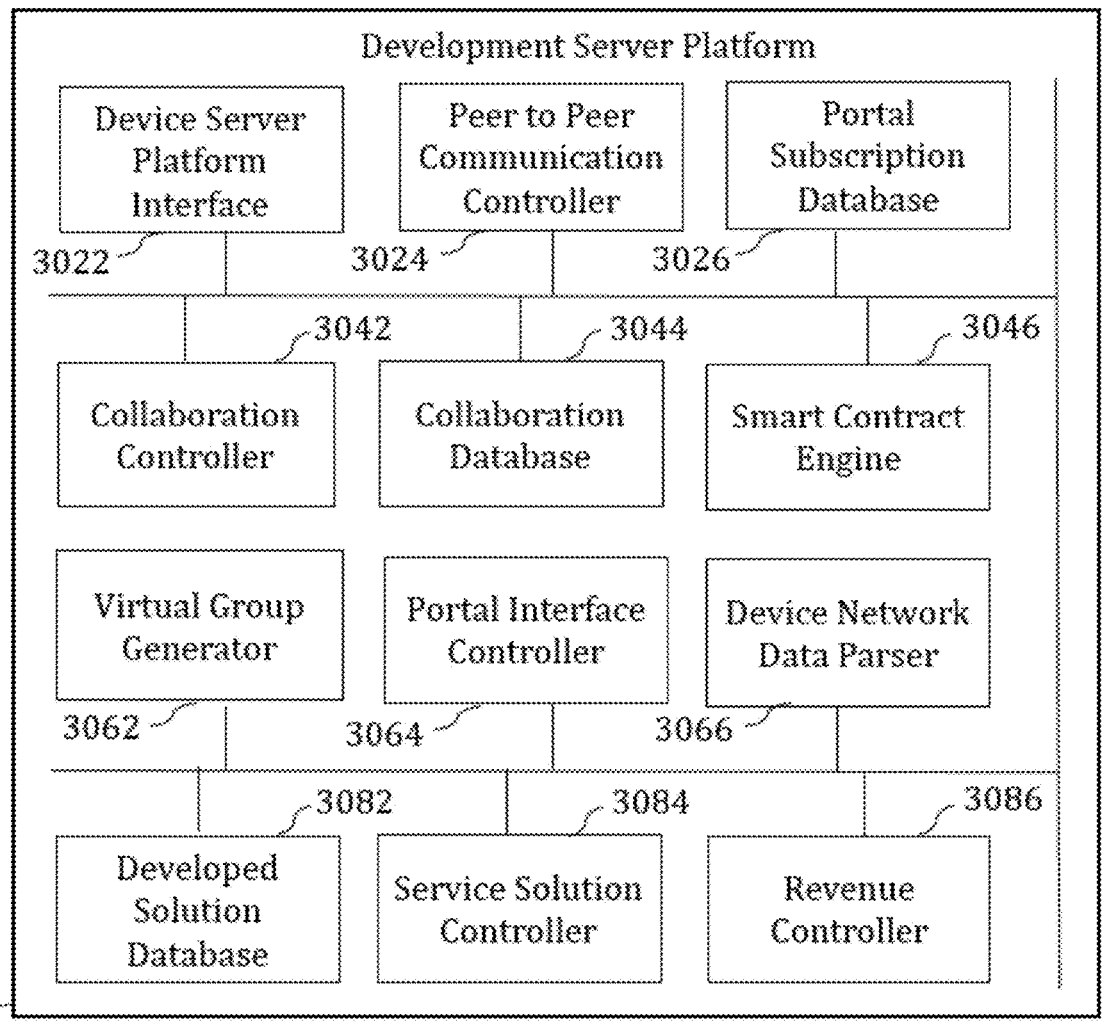
FIG. 3 illustrates an exemplary development server platform of a type that may be implemented within the system environment of FIG. 2.

FIG. 3 illustrates an exemplary development server platform 300 of a type that may be implemented within the system environment of FIG. 2.

Development server platform 300 comprises one or more of a processor implemented device server platform interface 3022, a processor implemented peer to peer communication controller, a portal subscription database 3026, a processor implemented collaboration controller 3042, a collaboration database 3044, a processor implemented smart contract engine 3046, a processor implemented virtual group generator 3062, a processor implemented portal interface controller 3064, a processor implemented device network data parser 3066, a developed solution database 3082, a processor implemented service solution controller 3084, and a processor implemented revenue controller 3086. Each of the above components of development server platform 300 is described in terms of configuration and functionality below.

Device server platform interface 3022 comprises a processor implemented communication network interface configured to enable one or more entities that are communicably coupled with development server platform 300 to communicate directly with said development server platform 300, and to communicate with other entities through development server platform 300.

Peer to peer communication controller 3024 comprises a processor implemented communication controller that enables collaborating entities to communicate with each other for the purposes of developing and/or distributing a collaboratively developed solution through development server platform 300.

Portal subscription database 3026 comprises a non-transitory memory database that is used to retrievably store data/information concerning entities that are registered to access or use the various functionalities of development server platform 300. In an embodiment, one or more of the remaining components of development server platform 300 may be configured to permit network communications with a specific entity, only if such entity is registered to access or use the specific functionality of development server platform 300, or of the specific entity.

Collaboration controller 3042 comprises a processor implemented controller configured to implement or to enable collaborating entities to implement the specific steps or actionables within an ongoing collaboration that is being implemented within the environment of development server platform 300. Said collaboration controller 3042 may be configured so as to monitor or control access rights and actionables that are executed or that require to be executed by one or more participants in a collaboration project.

Collaboration database 3044 comprises a non-transitory memory based database configured for retrievable storage of data corresponding to one or more initiated, pending or completed collaborative development projects—which collaborative development projects involve at least two entities that are communicatively coupled with development server platform 300 (for example at least two entities from among the entities illustrated in FIG. 2 and that are communicatively coupled with development server platform 202). In an embodiment of the invention, the at least two entities are distinct from the development server platform 300.

Smart contract engine 3046 comprises a processor implemented engine configured to record or generate a contract establishing the rights and obligations of each collaborating entity associated with an initiated, ongoing or completed collaborative development project. In an embodiment, smart contract engine 3046 may be configured to generate self-executing distributed ledger based or blockchain based smart contracts for the purposes of implementing the respective rights and obligations of each collaborating entity associated with an initiated, ongoing or completed collaborative development project.

Virtual group generator 3062 comprises a processor implemented generator configured to electronically generate a virtual group, folder or electronic project repository that is associated with a particular collaborative development project that has been initiated or is ongoing, and within which, the participants or collaborators may respectively save their contributions or access or modify contributions by other participants or collaborators for the purpose of the collaborative development. In an embodiment, a virtual group generated in connection with a collaborative development project would be linked to the electronic accounts/subscription accounts of each of the participants or collaborators that have been registered for that collaborative development project—such that the collaborators may access the virtual group through their respective electronic accounts/subscription accounts created and maintained by development server platform 300.

Portal interface controller 3064 comprises a processor implemented controller configured to generate an input-output interface (for example a visual display interface) configured to enable data communication between participants in one or more collaborative development projects and development server platform 300, and between the participants themselves. It would be understood that portal interface controller 3064 may be configured to create a network communication accessible online or cloud based portal through which participants in one or more collaborative development projects can interact and collaboratively develop software applications or software solutions.

Device network data parser 3066 comprises a processor implemented data parser configured to receive data from one or more device or device networks that are monitored or controlled through a device server platform that may be communicably coupled with development server platform 300 (for example device server platform 204 of FIG. 2). The functionality of device network data parser 3066 is described in more detail in connection with the subsequent Figures.

Developed solution database 3082 comprises a non-transitory memory based database configured to retrievably store solutions and/or applications that have been collaboratively developed through development server platform 300—and which have been made available for distribution or third party access through development server platform 300.

Service solution controller 3084 comprises a processor implemented controller configured to authorize or enable third party access to solutions and/or applications that have been collaboratively developed through development server platform 300—for implementation of such solutions and/or applications within a system environment (for example within an IIOT environment). In a particular embodiment, service solution controller 3084 enables one or more device server platforms (for example device server platform 204) that is communicably coupled with development server platform 300 to implement one or more collaboratively developed solutions and/or applications that are retrievably stored in developed solutions database 3082 to monitor or control devices within device networks that are controlled by said device server platform.

Revenue controller 3086 comprises a processor implemented controller configured to implement or enforce sharing of revenues received in connection with third party use of solutions and/or applications that has been authorized or enabled by service solution controller 3084, between the collaborators or participants who have collaboratively developed such solutions and/or applications. In an embodiment, revenue controller 3086 is configured to implement sharing of revenues in accordance with revenue shares that are specified in the smart contract(s) associated with or generated for the concerned collaboratively developed solutions and/or applications.

Figure 4:
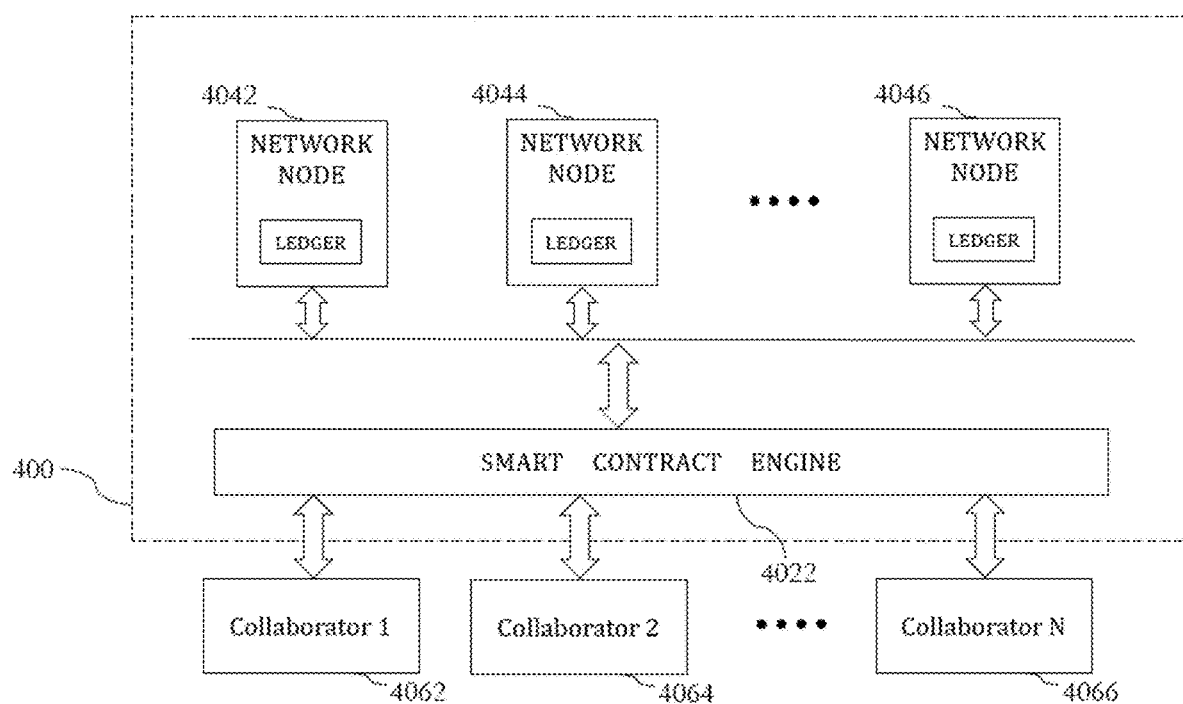
FIG. 4 illustrates an embodiment of the present invention that is based on a distributed ledger implementation.

FIG. 4 illustrates, in more detail, a system environment 400 which enables the functioning of an embodiment of smart contract engine 3046 of development platform 300. In the illustrated system environment 400, smart contract engine 4022 is configured to implement a distributed ledger or blockchain for storing smart contracts corresponding to each collaborative project or collaborative development assignment being implemented through development server platform 300.

As shown in FIG. 4 smart contract engine 4022 is configured to receive from each of collaborators 1 to N (4062, 4064, 4066), information defining the respective rights and obligations to which the identified collaborators have agreed for the purposes of implementing a collaborative development project, and to generate a contract recording each of these respective rights and the obligations. Further, as shown in FIG. 4, smart contract engine 4022 is communicably coupled with a plurality of network nodes 4042, 4044, 4046 configured to implement a distributed ledger storage structure (i.e. blockchain storage structure). Each network node 4042 to 4046 is configured to operate as a peer device and may store its own copy of the distributed ledger. It would be understood that the decentralized distributed ledger structure illustrated in FIG. 4 permits for multiple different configurations including any one or more of the following configurations (i) each network node 4042 to 4046 may be implemented on a respective peer processing device that is simultaneously used to implement smart contract engine 4022, or (ii) smart contract engine 4022 may be implemented on a processor that is external to peer devices which are configured to implement one or more network nodes 4042 to 4046, or (iii) a plurality of the network nodes 4042 to 4046 (and the distributed ledgers corresponding to said plurality of network nodes) are implemented through a single processing device and/or a single database or single memory repository and/or within development server platform 300 of FIG. 3.

In a particular embodiment, smart contract data stored by smart contract engine 4022 within the distributed ledger structure of FIG. 4 may be cryptographically secured, for example using public-private key cryptography.

Figure 5:
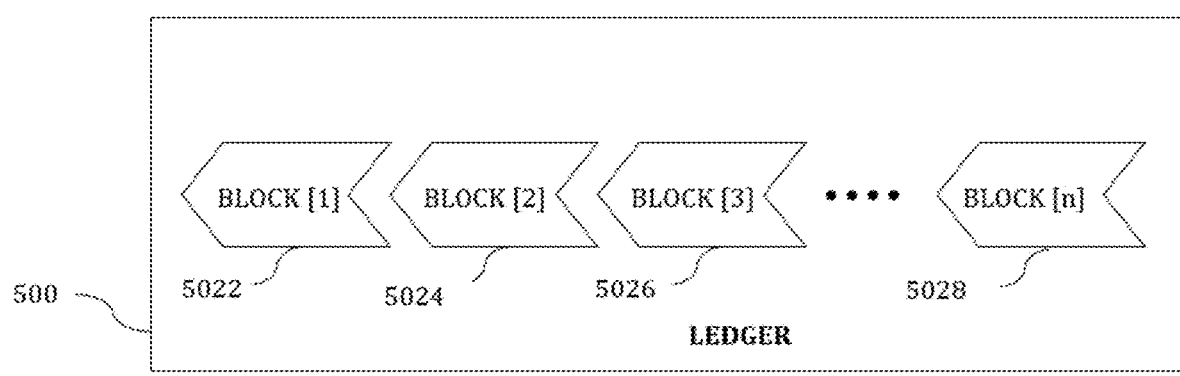
FIG. 5 illustrates an exemplary structure for a distributed ledger in accordance with the teachings of the present invention.

FIG. 5 illustrates an exemplary distributed ledger 500 comprising transaction blocks [1] to [n]. Each transaction block is linked to the immediately preceding block in the ledger, for example by ensuring that the header of each transaction block includes information regarding the identity or location of the immediately preceding block in the distributed ledger—thereby enabling the distributed ledger to be parsed from the most recently appended transaction block, through each intermediate transaction block and up to the first block in the chain (i.e. up to the root block or the genesis block).

FIG. 6 illustrates an exemplary data structure 600 (block [i]) that may be used to store contents of a transaction block in accordance with a distributed ledger implementation of the present invention. In the data structure of FIG. 6, a transaction block 600 may include information describing (i) parties to a contract, (ii) each party's obligations under the contract, (iii) each party's rights under the contract, (iv) devices (for example, IOT sensors) involved in the contract implementation, (v) device permission(s) associated with implementation of the contract, and/or (vi) payment information, costing information or revenue share information. Data structures implementing some or all of the contents of the exemplary data structure of FIG. 6 may be used for the purposes of implementing a distributed ledger (blockchain ledger) based embodiment of the present invention.

Figure 7:
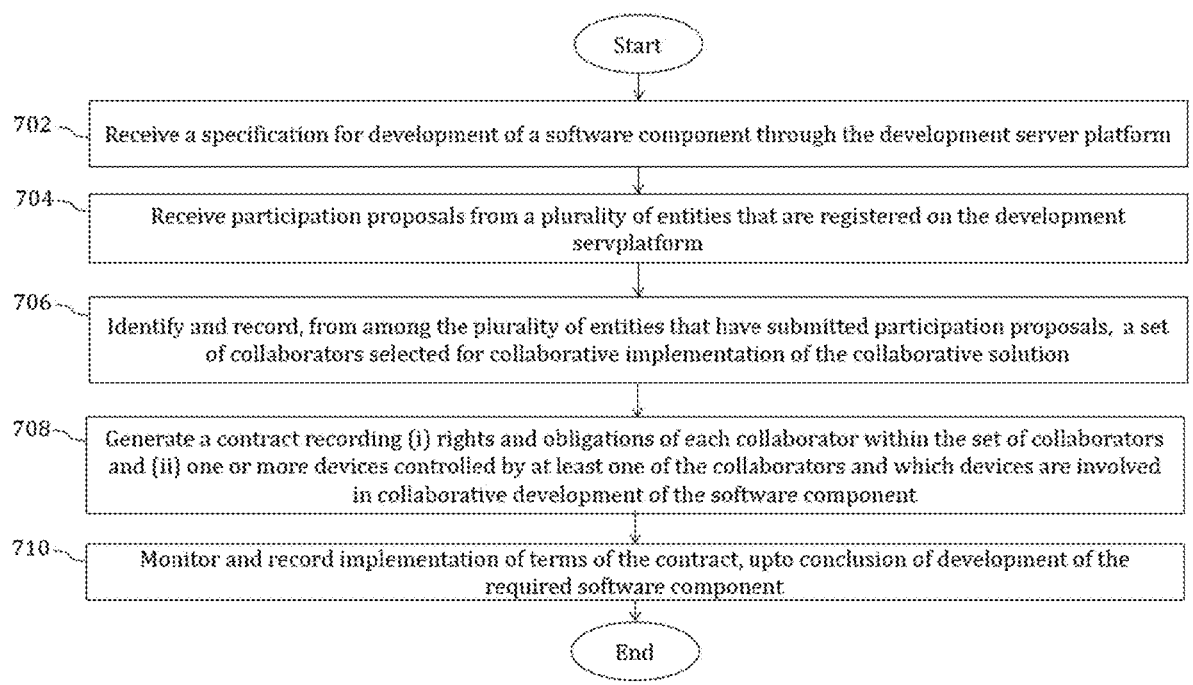
FIG. 7 illustrates a method of initiating development of a collaborative software solution within a system environment configured to implement the teachings of the present invention.

FIG. 7 illustrates a method of initiating collaborative development of a software component within a system environment configured to implement the teachings of the present invention.

The method of FIG. 7 is initiated at step 702 by receiving at or through development server platform 300, a specification for development of a specific software component. The specification of step 702 includes a specification for a software component that is capable of monitoring or controlling of, or interfacing or communicating with, one or more devices within a device network configured for the purposes of monitoring or controlling of, or interfacing or communicating with one or more assets, devices, sensors, components, tags or hardware or software within an industrial environment. In an embodiment of the method of FIG. 7, the specification may correspond to a software component configured for gathering data from the one or more devices, or processing data gathered from the one or more devices and automating or implementing our or more tasks or solutions based on the processed data.

Step 704 comprises receiving participation proposals from a plurality (at least two) of individual or entities connected to or registered with development server platform 300—which proposals may include one or more of, an expression of willingness to collaborate towards development of the specific software component, the proposing entity's capabilities and expertise, the obligations or work that the proposing entity proposes to undertake within the collaboration, and the rights or rewards/revenues that the proposing entity proposes to derive once the collaborative development of the software component is completed. In one embodiment of the invention, submission of participation proposals is limited to entities or individuals that are registered to access or use functionalities of development server platform 300—and whose information may be stored in and retrieved from portal subscription database 3026. In an embodiment of the invention, the participation proposals may be submitted at development server platform 300 through device server platform interface 3022, and proposing entities may thereafter discuss and/or modify or iteratively refine their proposals based on discussions with other entities (who are also seeking to collaborate in connection with development of the specific software component) through peer to peer communication controller 3024. In an embodiment of the invention, the participation proposals may be received or viewed or displayed through portal interface controller 3064 of development server platform 300. In a particular embodiment, one or more participation proposals may define participation parameters—which participation parameters include at least one of (i) information describing a respective entity's rights or responsibilities that such entity proposes in connection with its participation in collaborative development of the software component, (ii) a list of devices controlled by the entity corresponding to the received participation proposal, from which devices parameter data is proposed to be shared by said entity with one or more other entities from among the set of collaborator entities, or (iii) a duration or validity period for which parameter data from one or more devices controlled by the entity corresponding to the received participation proposal is proposed to be shared by said entity with one or more entities from among the set of collaborator entities.

Step 706 comprises identifying from among the plurality of entities that have submitted participation proposals, a set of collaborators that have been selected to collaboratively develop and implement the IIOT solution from step 702 and recording an association between the selected set of collaborators and the software component. Information identifying the selected set of collaborators, the software towards which they propose to collaborate for development purposes, and other relevant information, and further including in an embodiment, the proposals received from each of the selected collaborators, may be retrievably stored in collaboration database 3044.

The selection of the set of collaborators may be achieved in any number of ways—(including in an embodiment by mutual consent) based on the respective capabilities of, and agreements between the selected collaborators regarding rights and obligations of each selected collaborator both during the collaboration and subsequent to completion of development of the software component.

In an embodiment of the invention, the obligations of at least a first collaborator within the selected set of collaborators (for the purposes of the collaborative development of the software component) includes providing to at least a second collaborator within the selected set of collaborators, access to parameter data generated by one or more devices within one or more device networks (for example any of device networks 2062 to 2066) controlled by such first collaborator through a device server platform (for example, device server platform 204) that is communicably coupled with development server platform 300. In a more particular environment, the parameter data for which access is granted by the first collaborator to at least a second collaborator comprises time series parameter data generated based on one or more devices—for example, one or more devices configured to monitor or control one or more assets, devices, sensors, components, tags or hardware or software. In a further embodiment, the obligations of at least the second collaborator within the selected set of collaborators, includes generation of a model comprising a data based state detection model or a data based state prediction model, wherein generation of the model is based on access granted to said second collaborator in respect of parameter data generated by the first set of devices controlled by the first collaborator.

Step 708 thereafter comprises generating a contract or other digital record, recording (i) rights and obligations of each collaborator within the selected set of collaborators, that have been agreed to for the purposes of developing the specific software component, and/or (ii) identifying one or more devices (e.g. IOT sensors or IOT devices) within one or more device networks controlled by a first collaborator through a device server platform that is communicably coupled with development server platform 300, to whose device data at least a second collaborator is being granted access as part of the collaborative development process. In an embodiment of the invention, the contract generated at step 708 is a smart contract/self-executing contract generated by smart contract engine 3046 within development server platform 300. In various embodiments, the contract generated at step 708 may specify one or more types of machine learning algorithms, project phases, deliverables, and/or key performance indicators for each phase.

Step 710 thereafter comprises monitoring and recording implementation of the terms of the generated contract by the various collaborators within the selected set of collaborators. It would be understood that implementation of the terms of the generated contract would include implementation of the various steps of collaborative development of the software component by the selected set of collaborators—which steps of collaborative development would also be monitored and recorded. The implementation of the terms of the generated contract and/or implementation of the various steps of collaborative development of the software component by the selected set of collaborators may in an embodiment be monitored by smart contract engine 3046 and may be recorded in collaboration database 3044.

In a particular embodiment of the method the software component collaboratively developed pursuant to the method of FIG. 7 comprises or includes the model generated by the second collaborator within the selected set of collaborators.

Figure 8:
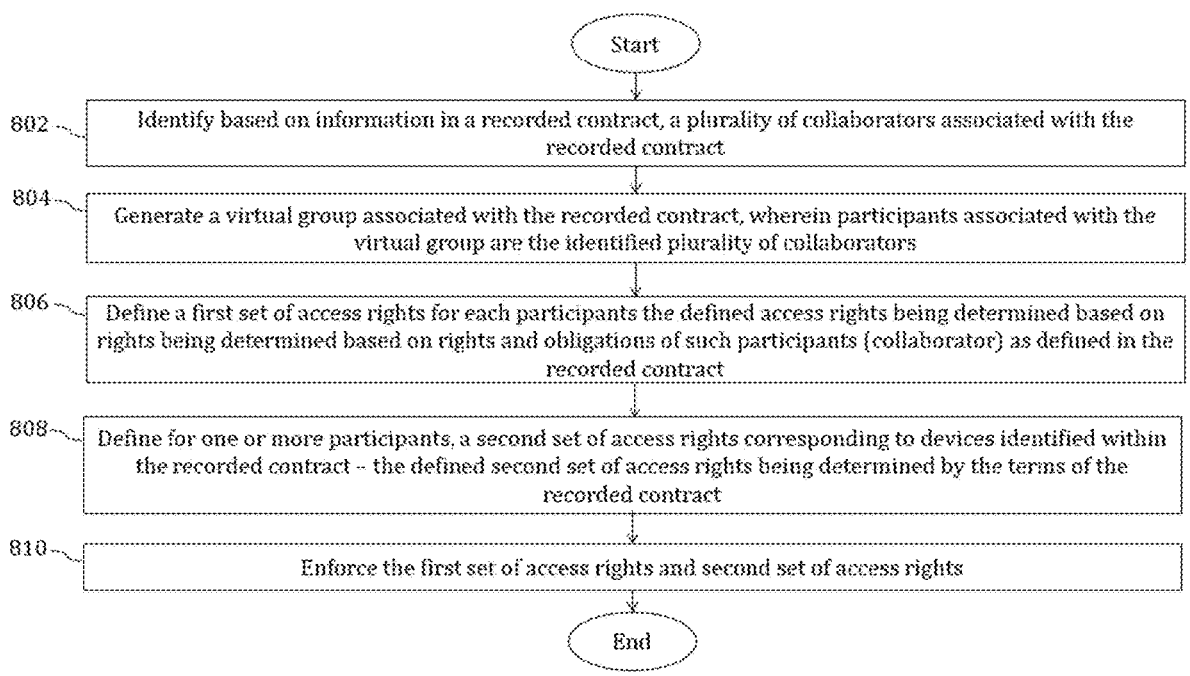
FIG. 8 illustrates a method of enabling collaborative development of a software component on which development has been initiated, within a system environment configured to implement the teachings of the present invention.

FIG. 8 illustrates a method of enabling collaborative development of a software component on which development has been initiated, within system environment 200.

Step 802 comprises identifying, based on information corresponding to a recorded contract corresponding to collaborative development of a software component (i.e. a contract generated in accordance with the method of FIG. 7), a plurality of collaborators that are associated with or identified within the recorded contract. Referring to the method of FIG. 7, the identified collaborators would comprise the set of collaborators that have been selected for collaboratively developing and implementing a software component through development server platform 300.

Step 804 comprises generating within development server platform 300, a virtual group associated with the recorded contract, which virtual group comprises an access controlled portal or virtual environment generated within development server platform 300 for the purposes of implementing collaborative development of the software component. The virtual group is generated such that a defined set of participants is permitted to access the virtual group and to participate in the collaborative development process associated with the development of the software component that is specified in the recorded contract. In a specific embodiment, the participants associated with the virtual group comprises at least, or is limited specifically to, the set of collaborators that have been identified or recorded within the recorded contract, as being responsible for collaborative development of the software component contemplated by the recorded contract. In an embodiment of the invention, information defining the generated virtual group may be stored in collaboration database 3044. In a specific embodiment, generation of the virtual group includes the step of linking the virtual group with development server platform accounts (generated and maintained by development server platform 300) corresponding to each of the participants within the set of participants associated with a collaborative software component development project.

Step 806 comprises configuring the properties or parameters of the virtual group by defining a first set of access rights—said first set of access rights comprising the access rights of each of the participants in the virtual group—which access rights identify and enforce the access and functionality that development platform server 300 makes available to individual participants with respect to the generated virtual group. In an embodiment, the access rights granted to each participant are determined based on the rights and obligations of said participants that are specified or defined in the recorded contract associated with the recorded contract that has been generated in accordance with the method of FIG. 7. In a specific embodiment, the access rights (first set of access rights) granted to individual participants with respect to a virtual group may be recorded in collaboration database 3044 and may be associated with one or more data records associated with said virtual group.

In an embodiment, the first set of access rights defines any one or more of (i) permissions defining access rights of one or more entities within the selected set of collaborator entities in respect of customer data of any other entity within the selected set of collaborator entities, or (ii) data access permissions concerning processing of customer data of any entity within the selected set of collaborator entities, based on one or more defined data privacy or data protection regulations.

Step 808 comprises configuring the properties or parameters of the virtual group by defining a second set of access rights—said second set of access rights defining access rights granted to one or more participants in the virtual group in respect of one or more devices that are controlled by at least one of the participants in the group—and which devices are identified within the recorded contract as being involved in the contract implementation (i.e. the devices that have been identified and recorded within the contract at step 708 of FIG. 7 as devices that are involved in collaborative development of the IIOT solution). In a specific embodiment, the second set of access rights defined with respect to a virtual group may also be recorded in collaboration database 3044 and may be associated with one or more data records associated with the virtual group.

Step 810 thereafter comprises enforcing/controlling participants' access to and operations within the virtual group based on the defined first set of access rights and second set of access rights that are associated with the virtual group.

Stated differently, at step 810 the collaboration between participants to a virtual group for the purposes of developing the collaborative IIOT solution for which the virtual group has been generated, is controlled based on the defined first and second set of access rights—thereby ensuring that each participant is only permitted to pursue such actionables, and access such data from one or more devices that are involved in the collaborative development, as have been mutually agreed to or permitted at the time when the smart contract corresponding to the concerned collaborative development of a software component was generated (in accordance with the method of FIG. 7). In an embodiment of the invention, enforcing or controlling participants' access to devices that are involved in the collaborative development is achieved through device network data parser 3066.

In an embodiment of the method of FIG. 8, one or more of steps 802 to 808 may be implemented by virtual group generator 3062 within development server platform 300. In an embodiment, step 810 may be implemented through portal interface controller 3064 within development server platform 300.

It would be understood that implementing the methods discussed above in connection with FIGS. 7 and 8, enables controlled and targeted collaboration between multiple entities through a development server platform for the purposes of initiating and successfully concluding collaborative development of a software component—which development includes collaborative development of at least one software component that is capable of monitoring or controlling, or of interfacing or communicating with one or more devices within a device network implemented for the purposes of monitoring or controlling one or more assets, devices, sensors components, tags or hardware or software within a system environment (for example, an industrial environment).

Figure 9:
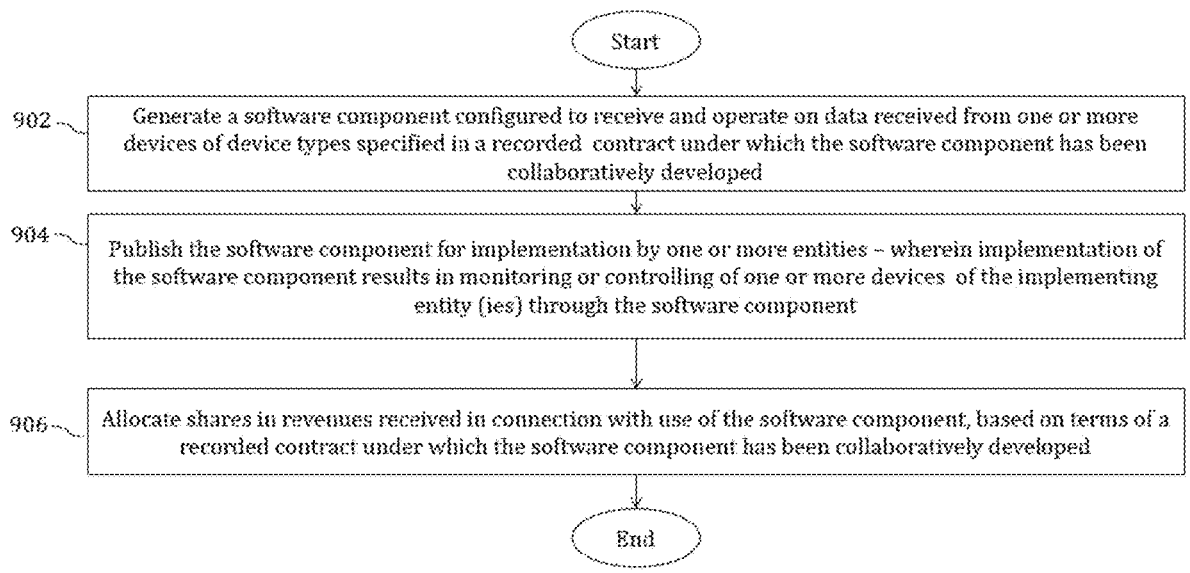
FIG. 9 illustrates a method of distributing a collaboratively developed software component solution that has been developed within a system environment configured to implement the teachings of the present invention.

FIG. 9 illustrates a method of distributing a software component that has been collaboratively developed through implementation of the methods of FIGS. 7 and 8—within a system environment configured to implement the teachings of the present invention.

Step 902 comprises generation of a software component configured to receive and operate on data from one or more devices that have (i) the same device type or (ii) one or more device properties—in comparison with one or more devices whose data has been accessed or used as part of the collaborative development process described in connection with FIGS. 7 and 8 (see for example, steps 708 and 808 of FIGS. 7 and 9 respectively) for development of the software component.

In an embodiment of the invention, the generated software component comprises compiled, pre-compiled or other software code comprising instructions for enabling monitoring, controlling, interfacing or communicating with one or more assets, devices, sensors, components, tags, hardware, software or data parameters within a system environment—which in an embodiment, is an industrial environment. In specific embodiments, the generated software component is configured to monitor or control devices that are discrete or different from the devices whose data has been accessed or used as part of the collaborative development process that has resulted in generated of the software component. In an embodiment, the generated software component may be stored in developed solution database 3062 within development server platform 300. In a particular embodiment, the generated software component is configured for installation, implementation or execution within a device server platform 204 that is configured to monitor or control one or more device networks.

Step 904 comprises publishing (or in any other way making available for download or implementation) the software component for access, download or implementation by one or more entities (for example, by one or more device server platforms 204)—wherein operation of the software component results in monitoring or controlling of one or more devices monitored or controlled by the implementing entity (ies) through the software component—preferably for the purposes of monitoring or controlling one or more assets, devices, sensors components, tags, hardware, software or data parameters within a system environment (for example, within an industrial environment).

In a particular embodiment, implementing the software component to control or monitor, or to interface or communicate with one or more devices comprises (i) accessing the software component through the development server platform, and configuring a processor based engine to implement one or more of control, monitoring, interfacing, data gathering, data processing or anomaly detection functionality in respect of a second set of devices that is distinct from a first set of devices from which parameter data has been received during the collaborative development process, and based on which the parameter data, the software component (or model used to implement or generate the software component) has been collaboratively developed—wherein the processor based engine comprises or is communicatively coupled with the collaboratively developed software component, for implementing said one or more of control, monitoring, interfacing, data gathering, data processing or anomaly detection functionality.

In specific embodiments, the software component is published for access, download or implementation by one or more entities that are distinct from or unrelated to the entities that have participated in the collaborative development of the software component. In an embodiment, the generated software component may be published and/or made available for access, download or implementation through portal interface controller 3064 within development server platform 300. Further, the access, download or implementation of the generated software component—for the purposes of monitoring or controlling one or more assets, devices, sensors, components, tags, hardware, software or data parameters of the accessing/downloading/implementing entity, within a system environment (for example, an industrial environment)—may be controlled and implemented through service solution controller 3084 within development server platform 300.

Step 906 comprises allocating shares in revenues/financial remuneration/fee received from one or more entities that have accessed, downloaded or implemented the generated software component to entities that have participated in the process of collaborative development of the generated software component. In an embodiment of the invention, the shares in the revenues/financial remuneration/fee that are received, are determined and allocated in accordance with the terms of the recorded contract under which the software component has been collaboratively developed. In an embodiment, the allocation of revenue shares at step 906 may be implemented through revenue controller 3086 within development server platform 3086.

In a particular embodiment, the invention provides methods, systems and computer programs relating to a collaboration platform configured for collaborative development and distribution of applications or software components for controlling, monitoring, interfacing or otherwise communicating with one or more devices.

In a method embodiment, the invention comprises a method for collaborative development of a software component for controlling, monitoring or interfacing with one or more devices configured for process or apparatus monitoring or control within an industrial environment, the method comprising (i) receiving at a development server platform, a specification for development of a software component for controlling, monitoring or interfacing with one or more devices, (ii) receiving participation proposals from a plurality of entities, each participation proposal including information describing participation parameters that such entity proposes for its participation in collaborative development of the software component, (iii) selecting from among the plurality of entities, a set of collaborator entities for collaboratively developing the software component, wherein the set of collaborator entities comprises at least two entities, and wherein the at least two entities are distinct from the development server platform, (iv) assigning one or more responsibilities associated with development of the software component to each entity within the selected set of collaborator entities, wherein one or more responsibilities assigned to at least a first entity within the selected set of collaborator entities includes enabling at least a second entity within the selected set of collaborator entities, to access parameter data generated by a first set of devices controlled by the first entity, (v) generating an access controlled portal that is associated with the collaborative development of the software component, wherein generating the access controlled portal includes defining (a) a first set of access rights associated with the access controlled portal, wherein the first set of access rights defines access or functionality available within the access controlled portal to each entity among the selected set of collaborator entities, and (b) a second set of access rights associated with the access controlled portal, wherein the second set of access rights defines access enabled by the first entity for the second entity to access the parameter data generated by the first set of devices controlled by the first entity, and (vi) publishing the collaboratively developed software component for implementing the software component to control, monitor or interface with, one or more devices.

In a method embodiment, the first set of devices may comprise a first set of IOT devices. In another embodiment, the one or more devices controlled, monitored or interfaced with by the software component are one or more IOT devices.

The software component may be configured for gathering data from the one or more devices, or for processing data gathered from the one or more devices and automating or implementing our or more tasks or solutions based on the processed data.

In an embodiment of the method, the performance responsibilities of the second entity include generation of a model comprising a data based state detection model or a data based state prediction model, wherein generation of the model is based on access granted to said second entity in respect of parameter data generated by the first set of devices controlled by the first entity.

In a further embodiment, the collaboratively developed software component comprises the model generated by the second entity.

Implementing the software component to control, monitor or interface with, one or more devices comprises (i) accessing the software component through the development server platform, and (ii) configuring a processor based engine to implement one or more of control, monitoring, interfacing, data gathering, data processing or anomaly detection functionality in respect of a second set of devices that is distinct from the first set of devices, wherein the processor based engine comprises or is communicatively coupled with the collaboratively developed software component, for implementing said one or more of control, monitoring, interfacing, data gathering, data processing or anomaly detection functionality.

In a particular embodiment of the method, the second set of devices comprises a set of IOT devices.

The participation parameters within each participation proposal may include at least one of (i) information describing a respective entity's rights or responsibilities that such entity proposes in connection with its participation in collaborative development of the software component, (ii) a list of devices controlled by the entity corresponding to the received participation proposal, from which devices parameter data is proposed to be shared by said entity with one or more other entities from among the set of collaborator entities, or (iii) a duration or validity period for which parameter data from one or more devices controlled by the entity corresponding to the received participation proposal is proposed to be shared by said entity with one or more entities from among the set of collaborator entities.

In an embodiment of the method, the first set of access rights defines any one or more of (i) permissions defining access rights of one or more entities within the selected set of collaborator entities in respect of customer data of any other entity within the selected set of collaborator entities, or (ii) data access permissions concerning processing of customer data of any entity within the selected set of collaborator entities, based on one or more defined data privacy or data protection regulations.

The parameter data generated by the first set of devices controlled by the first entity may comprise time series parameter data, and the first set of devices may be configured to monitor or control one or more assets, devices, components, tags, hardware or software within an industrial environment.

According to an embodiment of the method, responsibilities associated with development of the software component that have been assigned to each entity within the selected set of collaborator entities are recorded within a contract associated with the collaborative development of the software component. The contract associated with the collaborative development of the software component may include information identifying the first set of devices controlled by the first entity.

The contract may be recorded within a distributed ledger data structure.

In a method embodiment, collaborative development of the software component within the access controlled portal, by entities within the set of collaborator entities, is controlled by the access controlled portal based on the first set of access rights and the second set of access rights.

The developed software component may comprise computer readable instructions for causing one or more devices to monitor or control one or more assets, devices, components, tags, hardware, software or data parameters within an industrial environment.

The invention additionally provides a system for collaborative development of a controller for one or more devices that are configured for process or apparatus monitoring or control within an industrial environment. The system comprises at least one server configured to (i) receive at a development server platform, a specification for development of a software component for controlling, monitoring or interfacing with one or more devices, (ii) receive participation proposals from a plurality of entities, each participation proposal including information describing participation parameters that such entity proposes for its participation in collaborative development of the software component, (iii) select from among the plurality of entities, a set of collaborator entities for collaboratively developing the software component, wherein the set of collaborator entities comprises at least two entities, and wherein the at least two entities are distinct from the development server platform, (iv) assign one or more responsibilities associated with development of the software component to each entity within the selected set of collaborator entities, wherein one or more responsibilities assigned to at least a first entity within the selected set of collaborator entities includes enabling at least a second entity within the selected set of collaborator entities, to access parameter data generated by a first set of devices controlled by the first entity, (v) generate an access controlled portal that is associated with the collaborative development of the software component, wherein generating the access controlled portal includes defining (a) a first set of access rights associated with the access controlled portal, wherein the first set of access rights defines access or functionality available within the access controlled portal to each entity among the selected set of collaborator entities, and (b) a second set of access rights associated with the access controlled portal, wherein the second set of access rights defines access enabled by the first entity for the second entity to access the parameter data generated by the first set of devices controlled by the first entity, and (vi) publish the collaboratively developed software component for implementing the software component to control, monitor or interface with, one or more devices.

In a system embodiment, the first set of devices may comprise a first set of IOT devices. In another embodiment, the one or more devices controlled, monitored or interfaced with by the software component are one or more IOT devices.

The software component may be configured for gathering data from the one or more devices, or for processing data gathered from the one or more devices and automating or implementing our or more tasks or solutions based on the processed data.

In an embodiment of the system, the performance responsibilities of the second entity includes generation of a model comprising a data based state detection model or a data based state prediction model, wherein generation of the model is based on access granted to said second entity in respect of parameter data generated by the first set of devices controlled by the first entity.

In a further embodiment, the collaboratively developed software component comprises the model generated by the second entity.

In one system embodiment, implementing the software component to control, monitor or interface with, one or more devices comprises (i) accessing the software component through the development server platform, and (ii) configuring a processor based engine to implement one or more of control, monitoring, interfacing, data gathering, data processing or anomaly detection functionality in respect of a second set of devices that is distinct from the first set of devices, wherein the processor based engine comprises or is communicatively coupled with the collaboratively developed software component, for implementing said one or more of control, monitoring, interfacing, data gathering, data processing or anomaly detection functionality.

In a particular embodiment of the system, the second set of devices comprises a set of IOT devices.

The participation parameters within each participation proposal may include at least one of (i) information describing a respective entity's rights or responsibilities that such entity proposes in connection with its participation in collaborative development of the software component, (ii) a list of devices controlled by the entity corresponding to the received participation proposal, from which devices parameter data is proposed to be shared by said entity with one or more other entities from among the set of collaborator entities, or (iii) a duration or validity period for which parameter data from one or more devices controlled by the entity corresponding to the received participation proposal is proposed to be shared by said entity with one or more entities from among the set of collaborator entities.

In an embodiment of the system, the first set of access rights defines any one or more of (i) permissions defining access rights of one or more entities within the selected set of collaborator entities in respect of customer data of any other entity within the selected set of collaborator entities, or (ii) data access permissions concerning processing of customer data of any entity within the selected set of collaborator entities, based on one or more defined data privacy or data protection regulations.

The parameter data generated by the first set of devices controlled by the first entity may comprise time series parameter data, and the first set of devices may be configured to monitor or control one or more assets, devices, components, tags, hardware or software within an industrial environment.

According to an embodiment of the system, responsibilities associated with development of the software component that have been assigned to each entity within the selected set of collaborator entities are recorded within a contract associated with the collaborative development of the software component. The contract associated with the collaborative development of the software component may include information identifying the first set of devices controlled by the first entity.

The contract may be recorded within a distributed ledger data structure.

In a system embodiment, collaborative development of the software component within the access controlled portal, by entities within the set of collaborator entities, is controlled by the access controlled portal based on the first set of access rights and the second set of access rights.

The developed software component may comprise computer readable instructions for causing one or more devices to monitor or control one or more assets, devices, components, tags, hardware, software or data parameters within an industrial environment.

Yet further, the invention provides a computer program product for collaborative development of a software component for controlling, monitoring or interfacing with one or more devices configured for process or apparatus monitoring or control within an industrial environment, the computer program product comprising a non-transitory computer usable medium having a computer readable program code embodied therein, the computer readable program code comprising instructions for implementing within a processor based computing system, the steps of (i) receiving at a development server platform, a specification for development of a software component for controlling, monitoring or interfacing with one or more devices, (ii) receiving participation proposals from a plurality of entities, each participation proposal including information describing participation parameters that such entity proposes for its participation in collaborative development of the software component, (iii) selecting from among the plurality of entities, a set of collaborator entities for collaboratively developing the software component, wherein the set of collaborator entities comprises at least two entities, and wherein the at least two entities are distinct from the development server platform, (iv) assigning one or more responsibilities associated with development of the software component to each entity within the selected set of collaborator entities, wherein one or more responsibilities assigned to at least a first entity within the selected set of collaborator entities includes enabling at least a second entity within the selected set of collaborator entities, to access parameter data generated by a first set of devices controlled by the first entity, (v) generating an access controlled portal that is associated with the collaborative development of the software component, wherein generating the access controlled portal includes defining (a) a first set of access rights associated with the access controlled portal, wherein the first set of access rights defines access or functionality available within the access controlled portal to each entity among the selected set of collaborator entities, and (b) a second set of access rights associated with the access controlled portal, wherein the second set of access rights defines access enabled by the first entity for the second entity to access the parameter data generated by the first set of devices controlled by the first entity, and (vi) publishing the collaboratively developed software component for implementing the software component to control, monitor or interface with, one or more devices.

Figure 10:
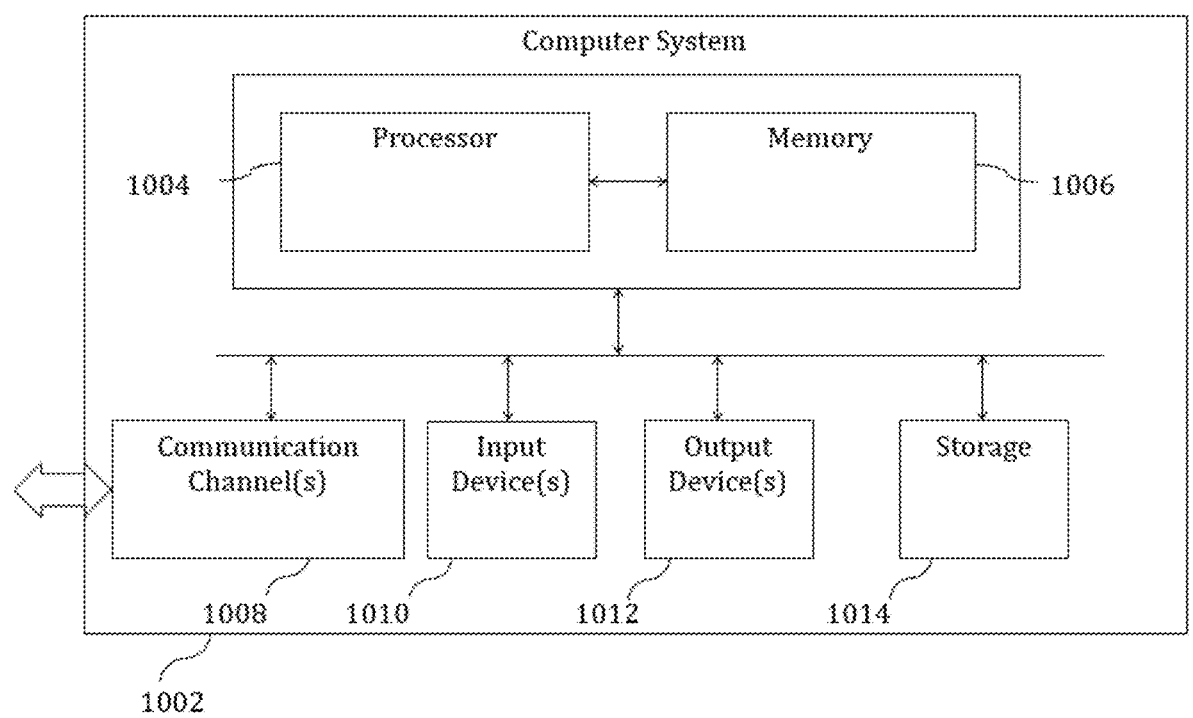
FIG. 10 illustrates an exemplary computer system according to which various embodiments of the present invention may be implemented.

FIG. 10 illustrates an exemplary computer system according to which various embodiments of the present invention may be implemented.

System 1000 includes computer system 1002 which in turn comprises one or more processors 1004 and at least one memory 1006. Processor 1004 is configured to execute program instructions—and may be a real processor or a virtual processor. It will be understood that computer system 1002 does not suggest any limitation as to scope of use or functionality of described embodiments. The computer system 1002 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1002 in accordance with the present invention may include one or more servers, desktops, laptops, tablets, smart phones, mobile phones, mobile communication devices, tablets, phablets and personal digital assistants. In an embodiment of the present invention, the memory 1006 may store software for implementing various embodiments of the present invention. The computer system 1002 may have additional components. For example, the computer system 1002 may include one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various softwares executing in the computer system 1002 using a processor 1004, and manages different functionalities of the components of the computer system 1002.

The communication channel(s) 1008 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1010 may include, but is not limited to, a touch screen, a keyboard, mouse, pen, joystick, trackball, a voice device, a scanning device, or any another device that is capable of providing input to the computer system 1002. In an embodiment of the present invention, the input device(s) 1010 may be a sound card or similar device that accepts audio input in analog or digital form. The output device(s) 1012 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1002.

The storage 1014 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present invention, the storage 1014 may contain program instructions for implementing any of the described embodiments.

In an embodiment of the present invention, the computer system 1002 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1002. The method described herein is typically implemented as a computer program product, comprising a set of program instructions that is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages—in particular, by enabling collaborative development of IIOT applications for monitoring, controlling or altering controls of one or more IOT devices within an industrial environment(s), enabling aggregation or accumulation of multiple different capabilities, data sources and expertise(s) in development of the IIOT application(s), and in enabling customers/end users to access or implement the collaboratively developed IIOT applications—all through a centralized development and distribution platform.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

I claim:

1. A method for collaborative development of a software component for controlling, monitoring, or interfacing with one or more devices configured for process or apparatus monitoring or control within an industrial environment, the method comprising:
   receiving, at a development server platform, a specification for collaborative development of a software component for controlling, monitoring, or interfacing with one or more devices;
   receiving participation proposals from a plurality of entities, wherein each participation proposal includes information describing participation parameters that such entity proposes for its participation in the collaborative development of the software component;
   selecting, from among the plurality of entities, a set of collaborator entities for collaboratively developing the software component, wherein the set of collaborator entities comprises at least two collaborator entities, and wherein the at least two collaborator entities are distinct from the development server platform;
   assigning one or more responsibilities associated with the collaborative development of the software component to each collaborator entity within the selected set of collaborator entities, wherein one or more responsibilities assigned to at least a first collaborator entity within the selected set of collaborator entities includes enabling at least a second collaborator entity within the selected set of collaborator entities to access parameter data generated by a first set of devices controlled by the first collaborator entity within the selected set of collaborator entities;
   generating an access controlled portal that is associated with the collaborative development of the software component, wherein generating the access controlled portal includes defining:
      a first set of access rights associated with the access controlled portal, wherein the first set of access rights defines access or functionality available within the access controlled portal to each collaborator entity among the selected set of collaborator entities; and
      a second set of access rights associated with the access controlled portal, wherein the second set of access rights defines access enabled by the first collaborator entity within the selected set of collaborator entities for the second collaborator entity within the selected set of collaborator entities to access the parameter data generated by the first set of devices controlled by the first collaborator entity within the selected set of collaborator entities; and
   publishing the collaboratively developed software component for implementing the software component to control, monitor, or interface with the one or more devices.

2. The method as claimed in claim 1, wherein:
   the first set of devices comprises a first set of Internet of Things (IoT) devices; and
   the one or more devices controlled, monitored, or interfaced with by the software component are one or more IoT devices.

3. The method as claimed in claim 1, wherein the software component is configured for:
   gathering data from the one or more devices; or
   processing data gathered from the one or more devices and automating or implementing one or more tasks or solutions based on the processed data.

4. The method as claimed in claim 1, wherein responsibilities of the second collaborator entity within the selected set of collaborator entities includes generation of a model comprising a data based state detection model or a data based state prediction model, and wherein generation of the model is based on access granted to the second collaborator entity within the selected set of collaborator entities in respect of parameter data generated by the first set of devices controlled by the first collaborator entity within the selected set of collaborator entities.

5. The method as claimed in claim 4, wherein the collaboratively developed software component comprises the model generated by the second collaborator entity within the selected set of collaborator entities.

6. The method as claimed in claim 5, wherein publishing the collaboratively developed software component for implementing the software component to control, monitor, or interface with the one or more devices comprises:
   accessing the software component through the development server platform; and
   configuring a processor based engine to implement one or more of control, monitoring, interfacing, data gathering, data processing, or anomaly detection functionality in respect of a second set of devices that is distinct from the first set of devices, wherein the processor based engine comprises or is communicatively coupled with the collaboratively developed software component for implementing the one or more of control, monitoring, interfacing, data gathering, data processing, or anomaly detection functionality.

7. The method as claimed in claim 6, wherein the second set of devices comprises a set of IoT devices.

8. The method as claimed in claim 1, wherein the participation parameters within each participation proposal includes at least one of (i) information describing a respective entity's rights or responsibilities that such entity proposes in connection with its participation in the collaborative development of the software component, (ii) a list of devices controlled by the entity corresponding to the participation proposal, from which devices parameter data is proposed to be shared by the entity with one or more other entities from among the set of collaborator entities, or (iii) a duration or validity period for which parameter data from one or more devices controlled by the entity corresponding to the participation proposal is proposed to be shared by the entity with one or more entities from among the set of collaborator entities.

9. The method as claimed in claim 1, wherein the first set of access rights defines any one or more of:
permissions defining access rights of one or more entities within the selected set of collaborator entities in respect of customer data of any other collaborator entity within the selected set of collaborator entities; or
data access permissions concerning processing of customer data of any collaborator entity within the selected set of collaborator entities based on one or more defined data privacy or data protection regulations.

10. The method as claimed in claim 1, wherein the parameter data generated by the first set of devices controlled by the first collaborator entity within the selected set of collaborator entities comprises time series parameter data, and wherein the first set of devices are configured to monitor or control one or more assets, devices, components, tags, hardware, or software within an industrial environment.

11. The method as claimed in claim 1, wherein responsibilities associated with the collaborative development of the software component that have been assigned to each collaborative entity within the selected set of collaborator entities are recorded within a contract associated with the collaborative development of the software component.

12. The method as claimed in claim 11, wherein the contract associated with the collaborative development of the software component includes information identifying the first set of devices controlled by the first collaborator entity within the selected set of collaborator entities.

13. The method as claimed in claim 11, wherein the contract associated with the collaborative development of the software component is recorded within a distributed ledger data structure.

14. The method as claimed in claim 1, wherein the collaborative development of the software component within the access controlled portal, by entities within the set of collaborator entities, is controlled by the access controlled portal based on the first set of access rights and the second set of access rights.

15. The method as claimed in claim 1, wherein the software component comprises computer readable instructions for causing one or more devices to monitor or control one or more assets, devices, components, tags, hardware, software, or data parameters within an industrial environment.

16. A system for collaborative development of a controller for one or more devices that are configured for process or apparatus monitoring or control within an industrial environment, the system comprising:
at least one server including a processor and a memory, wherein the at least one server is configured to:
receive, at a development server platform, a specification for collaborative development of a software component for controlling, monitoring, or interfacing with one or more devices;
receive participation proposals from a plurality of entities, wherein each participation proposal includes information describing participation parameters that such entity proposes for its participation in the collaborative development of the software component;
select, from among the plurality of entities, a set of collaborator entities for collaboratively developing the software component, wherein the set of collaborator entities comprises at least two collaborator entities, and wherein the at least two collaborator entities are distinct from the development server platform;
assign one or more responsibilities associated with the collaborative development of the software component to each collaborator entity within the selected set of collaborator entities, wherein one or more responsibilities assigned to at least a first collaborator entity within the selected set of collaborator entities includes enabling at least a second collaborator entity within the selected set of collaborator entities to access parameter data generated by a first set of devices controlled by the first collaborator entity within the selected set of collaborator entities;
generate an access controlled portal that is associated with the collaborative development of the software component, wherein generating the access controlled portal includes defining:
a first set of access rights associated with the access controlled portal, wherein the first set of access rights defines access or functionality available within the access controlled portal to each collaborator entity among the selected set of collaborator entities; and
a second set of access rights associated with the access controlled portal, wherein the second set of access rights defines access enabled by the first collaborator entity within the selected set of collaborator entities for the second collaborator entity within the selected set of collaborator entities to access the parameter data generated by the first set of devices controlled by the first collaborator entity within the selected set of collaborator entities; and
publish the collaboratively developed software component for implementing the software component to control, monitor, or interface with the one or more devices.

17. The system as claimed in claim 16, wherein:
the first set of devices comprises a first set of Internet of Things (IoT) devices; and
the one or more devices controlled, monitored, or interfaced with by the software component are one or more IoT devices.

18. The system as claimed in claim 16, wherein the software component is configured for:
gathering data from the one or more devices; or
processing data gathered from the one or more devices and automating or implementing one or more tasks or solutions based on the processed data.

19. The system as claimed in claim 16, wherein responsibilities of the second collaborator entity within the selected set of collaborator entities includes generation of a model comprising a data based state detection model or a data based state prediction model, and wherein generation of the model is based on access granted to the second collaborator entity within the selected set of collaborator entities in respect of parameter data generated by the first set of devices controlled by the first collaborator entity within the selected set of collaborator entities.

20. The system as claimed in claim 19, wherein the collaboratively developed software component comprises the model generated by the second collaborator entity within the selected set of collaborator entities.

21. The system as claimed in claim 20, wherein publishing the collaboratively developed software component for implementing the software component to control, monitor, or interface with the one or more devices comprises:
accessing the software component through the development server platform; and configuring a processor based engine to implement one or more of control, monitoring, interfacing, data gathering, data processing, or anomaly detection functionality in respect of a second set of devices that is distinct from the first set of devices, wherein the processor based engine comprises or is communicatively coupled with the collaboratively developed software component for implementing the one or more of control, monitoring, interfacing, data gathering, data processing, or anomaly detection functionality.

22. The system as claimed in claim 21, wherein the second set of devices comprises a set of IoT devices.

23. The system as claimed in claim 16, wherein the participation parameters within each participation proposal includes at least one of (i) information describing a respective entity's rights or responsibilities that such entity proposes in connection with its participation in the collaborative development of the software component, (ii) a list of devices controlled by the entity corresponding to the participation proposal, from which devices parameter data is proposed to be shared by the entity with one or more other entities from among the set of collaborator entities, or (iii) a duration or validity period for which parameter data from one or more devices controlled by the entity corresponding to the participation proposal is proposed to be shared by the entity with one or more entities from among the set of collaborator entities.

24. The system as claimed in claim 16, wherein the first set of access rights defines any one or more of:
   permissions defining access rights of one or more entities within the selected set of collaborator entities in respect of customer data of any other collaborator entity within the selected set of collaborator entities; or
   data access permissions concerning processing of customer data of any collaborator entity within the selected set of collaborator entities based on one or more defined data privacy or data protection regulations.

25. The system as claimed in claim 16, wherein the parameter data generated by the first set of devices controlled by the first collaborator entity within the selected set of collaborator entities comprises time series parameter data, and wherein the first set of devices are configured to monitor or control one or more assets, devices, components, tags, hardware, or software within an industrial environment.

26. The system as claimed in claim 16, wherein responsibilities associated with the collaborative development of the software component that have been assigned to each collaborator entity within the selected set of collaborator entities are recorded within a contract associated with the collaborative development of the software component.

27. The system as claimed in claim 26, wherein the contract associated with the collaborative development of the software component includes information identifying the first set of devices controlled by the first collaborator entity within the selected set of collaborator entities.

28. The system as claimed in claim 26, wherein the contract associated with the collaborative development of the software component is recorded within a distributed ledger data structure.

29. The system as claimed in claim 16, wherein the collaborative development of the software component within the access controlled portal, by entities within the set of collaborator entities, is controlled by the access controlled portal based on the first set of access rights and the second set of access rights.

30. The system as claimed in claim 16, wherein the software component comprises computer readable instructions for causing one or more devices to monitor or control one or more assets, devices, components, tags, hardware, software, or data parameters within an industrial environment.

31. A computer program product for collaborative development of a software component for controlling, monitoring, or interfacing with one or more devices configured for process or apparatus monitoring or control within an industrial environment, the computer program product comprising a non-transitory computer usable medium having a computer readable program code embodied therein, the computer readable program code comprising instructions for implementing within a processor based computing system, the steps of:
   receiving, at a development server platform, a specification for collaborative development of a software component for controlling, monitoring, or interfacing with one or more devices;
   receiving participation proposals from a plurality of entities, wherein each participation proposal includes information describing participation parameters that such entity proposes for its participation in the collaborative development of the software component;
   selecting, from among the plurality of entities, a set of collaborator entities for collaboratively developing the software component, wherein the set of collaborator entities comprises at least two collaborator entities, and wherein the at least two collaborator entities are distinct from the development server platform;
   assigning one or more responsibilities associated with the collaborative development of the software component to each collaborator entity within the selected set of collaborator entities, wherein one or more responsibilities assigned to at least a first collaborator entity within the selected set of collaborator entities includes enabling at least a second collaborator entity within the selected set of collaborator entities to access parameter data generated by a first set of devices controlled by the first collaborator entity within the selected set of collaborator entities;
   generating an access controlled portal that is associated with the collaborative development of the software component, wherein generating the access controlled portal includes defining:
      a first set of access rights associated with the access controlled portal, wherein the first set of access rights defines access or functionality available within the access controlled portal to each collaborator entity among the selected set of collaborator entities; and
      a second set of access rights associated with the access controlled portal, wherein the second set of access rights defines access enabled by the first collaborator entity within the selected set of collaborator entities for the second collaborator entity within the selected set of collaborator entities to access the parameter data generated by the first set of devices controlled by the first collaborator entity within the selected set of collaborator entities; and
   publishing the collaboratively developed software component for implementing the software component to control, monitor, or interface with the one or more devices.

* * * * *